(12) United States Patent
Mayer

(10) Patent No.: US 7,596,532 B2
(45) Date of Patent: Sep. 29, 2009

(54) WEB SERVER INTEGRATED DIRECTLY INTO AN INSERTER SYSTEM TO PROVIDE STATUS MONITORING AND CONFIGURATION CONTROL

(75) Inventor: Paul Mayer, Middlesbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 1318 days.

(21) Appl. No.: 10/675,368

(22) Filed: Sep. 30, 2003

(65) Prior Publication Data

US 2005/0071292 A1 Mar. 31, 2005

(51) Int. Cl.
*G07B 17/02* (2006.01)
(52) U.S. Cl. ....................................... 705/401
(58) Field of Classification Search ................ 705/401
See application file for complete search history.

(56) References Cited

U.S. PATENT DOCUMENTS

| | | | |
|---|---|---|---|
| 6,334,119 B1 * | 12/2001 | Gagliardi et al. | 705/60 |
| 2002/0083018 A1 * | 6/2002 | Carroll et al. | 705/401 |
| 2003/0101446 A1 * | 5/2003 | McManus et al. | 717/178 |

OTHER PUBLICATIONS

Tyler, Geoff, "More Snails in the Mail," Management Services, Enfield, Feb. 2002, vol. 46, Iss. 2, p. 22.*

* cited by examiner

*Primary Examiner*—John W Hayes
*Assistant Examiner*—Nathan Erb
(74) *Attorney, Agent, or Firm*—Michael J. Cummings; Angelo N. Chaclas

(57) ABSTRACT

An inserter device including a plurality of modules for accumulating and assembling sheets into mail pieces. A controller computer is coupled to the plurality of modules and controls assembly of mail pieces in accordance with predetermined instructions. The controller computer receives the status data from the plurality of modules. Software based data processing objects process the inserter status data. The data processing objects pass processed status data directly to a network protocol object. Thereby status data is available for transmittal immediately, and there is no need for storage or a repository for periodic uploading. The inserter controller computer further includes a network port for directly transmitting the status data processed by the network protocol object to an external network, such as the Internet. The network port and the network protocol object accept incoming requests from the external network and immediately provide the requested information.

4 Claims, 2 Drawing Sheets

WEB SERVER INTEGRATED DIRECTLY INTO AN INSERTER SYSTEM TO PROVIDE STATUS MONITORING AND CONFIGURATION CONTROL

The present invention relates to a system for remotely monitoring and controlling mail production inserter equipment.

BACKGROUND

Systems for mass producing mail pieces are well known in the art. Such systems are typically used by organizations such as banks, insurance companies and utility companies for producing a large volume of specific mailings like billing statements, or promotional offers. The starting point for the document production process is a stream of print data generated by the organization wishing to create the mailing. The print streams are usually produced by older, legacy, computer systems that are not easily adapted to do more than provide raw print data that is output as a result of the legacy computer systems' business logic.

The raw print stream data may be manipulated using known print stream manipulation software, such as the Streamweaver™ product of Pitney Bowes Inc. Print stream manipulation software allows users to change the look and content of documents, without requiring changes to the legacy computer systems.

Once print stream manipulation is complete, the print stream may be sent to a high volume printer. Such high volume printing results in large rolls or stacks of documents, usually connected in a continuous web. The webs of documents are transported to an inserter machine to be separated into individual pages and turned into mail pieces. Examples of such inserter systems are the 8 series and 9 series inserter systems available from Pitney Bowes Inc. of Stamford Conn.

In many respects the typical inserter system resembles a manufacturing assembly line. Sheets and other raw materials (other sheets, enclosures, and envelopes) enter the inserter system as inputs. A plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

Each collation of documents processed by the inserter system typically includes a control document having coded control marks printed thereon. Scanners are located throughout the inserter system to sense documents and to allow control for processing of a particular mail piece. The coded marks may be bar codes, UPC code, or the like.

The inserter system control system is coupled to the inserter system's modular components. The control system stores data files identifying how individual mail pieces should be processed. These data files are typically linked to individual mail pieces by the coded marks included on the control documents. As a collation passes through the inserter system, the coded marks on the control document are scanned and the control system directs the modular components to assemble the mail piece as appropriate. Mail pieces such as billing statements will often include a reply document and/or a return envelope that is pre-addressed for delivery back to the originator of the mail piece. Such reply documents and return envelopes may be used to send back payments, or acceptances of offers, or the like.

Once a finished mail piece has been formed by the inserter system, it may be stacked and provided to a carrier service, such as the U.S. Postal Service, for delivery. Often, in order to receive postal discounts, it is advantageous to sort the outgoing mail in accordance postal regulations. Such output sorting devices are well known. Examples of output sorting devices are available from MailCode, Inc.

With conventional inserter systems it is sometimes desired to remotely monitor the status and configuration of the inserter equipment. In order to accomplish this, the inserter control system stores status information for various modules in a database. Such database is typically stored on a hard drive on a controller computer. Periodically this database is uploaded to an external network server from the controller computer hard drive. This network server includes the appropriate protocols to allow the database information to be transmitted over a network. For example, an HTTP Internet server may serve a database or repository populated with information from the inserter controller.

SUMMARY OF THE INVENTION

The present invention fills a long standing need to provide the most current inserter status and configuration information for transmission over a network. The invention eliminates the need for a database or repository for storing inserter status information by incorporating a web server directly into the inserter control equipment. By incorporating the web server directly into the inserter controller, current status information may be efficiently provided on demand, and in real-time.

An inserter using the present invention includes a plurality of modules for accumulating and assembling sheets into mail pieces. Data is gathered from throughout the plurality of modules in connection with inserter status and configuration.

A controller computer is coupled to the plurality of modules and controls assembly of mail pieces in accordance with predetermined instructions. The controller computer further monitors the status of the modules along with receiving sensor signals from the sensors throughout. Software based data processing objects process the inserter status data. The data processing objects pass processed status data directly to a network protocol object. Thereby status data is available for transmittal immediately, and there is no need for storage or a repository for periodic uploading. The inserter controller computer further includes a network port for directly transmitting the status data processed by the network protocol object to an external network, such as the World Wide Web, or Internet. The network port and the network protocol object accept incoming requests from the external network, and immediately provide the requested information.

Further details of the present invention are provided in the accompanying detailed description, figures and claims.

DETAILED DESCRIPTION

Figure 1:
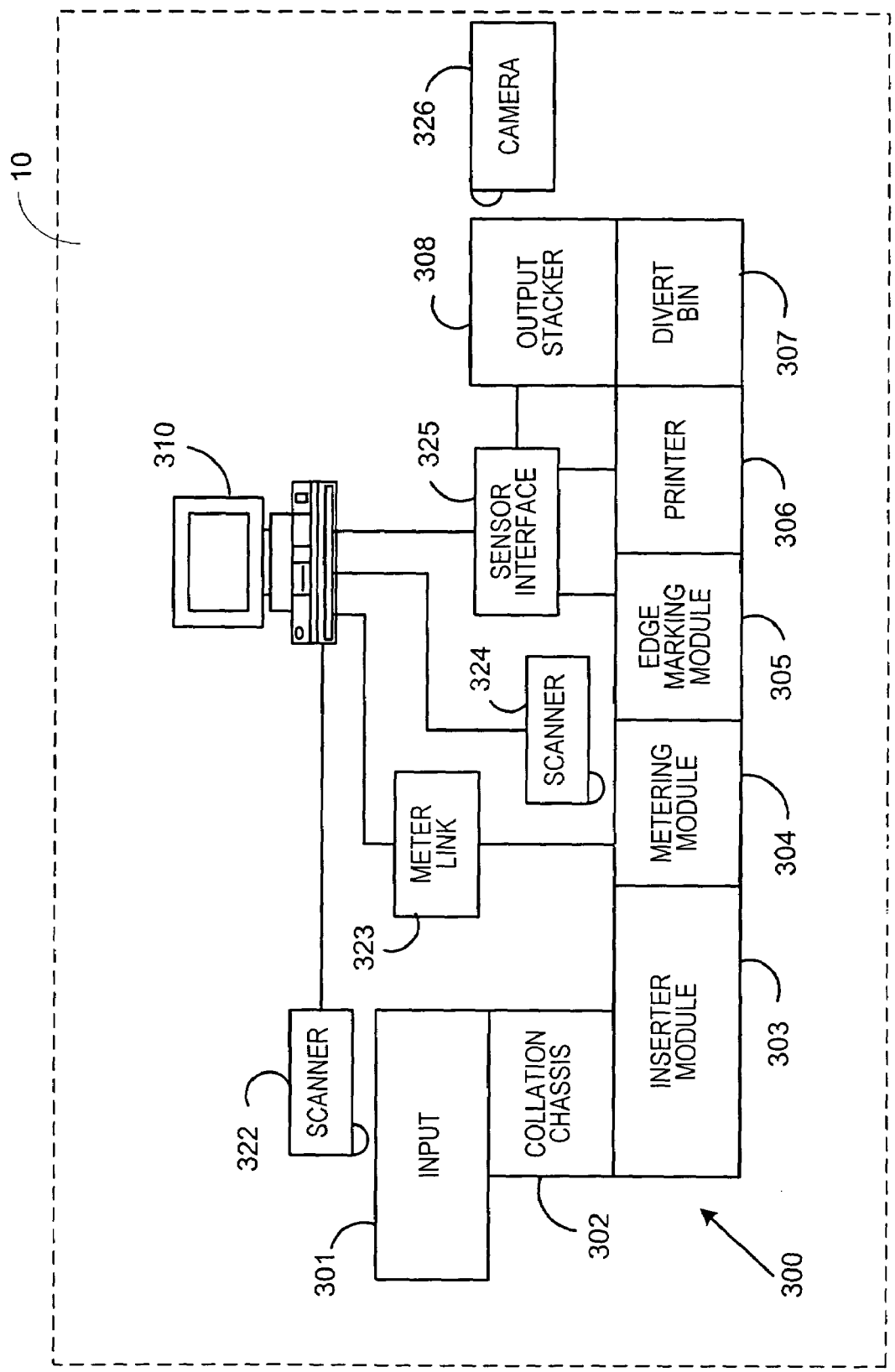
FIG. 1 is a first view of an exemplary inserter and controller computer combination.

FIG. 1 provides an exemplary mail production system 10. The system 10 includes an inserter apparatus 300, with accompanying sensors and computer control. A local computer 310 provides the processing instructions to the inserter 300 and receives status information from the inserter 300. Status information may include both operational parameters of the equipment, along with current status of the machine or machine operation. The parameter and status information is typically associated with a particular mail run that the inserter 300 is preparing. Such parameter and status information is useful for determining inserter or operator productivity, and for mail run job planning purposes.

A collation chassis 302 collects documents and inserts together, and the collations are stuffed into envelopes in an inserter module. The chassis module 302 typically includes feeders that feed individual sheets onto a moving belt below. Collations of sheets are gathered in accordance with instructions from the controller computer 310. In an exemplary embodiment, feeder parameters and status may be monitored by the controller computer. If a particular feeder were determined to be jamming more frequently than others, then corrective action may be taken.

Collations are inserted into envelopes at inserter module 303. Stuffed envelopes can be metered at a metering module 304. Such metering activity is in turn monitored and controlled through meter link 323 by local computer 310. A scanner 324 further tracks the progress of documents through the inserter machine by looking for the codes on the documents indicating that the corresponding mail piece has reached the stage at which the scanner 324 is positioned.

Further inserter processing may be carried out at an edge marking module 305 and a printer 306 for putting delivery information onto the stuffed envelopes. Sensors within modules 301-308 communicate with sensor interface 325 to provide machine status and document status information to the local computer 310.

A divert bin 307 collects misprocessed mail pieces. Finally, an output stacker 308, sorts the finished mail pieces by postal codes in order that the sender may receive postal presorting discounts. A camera 326 may capture an image of the completed envelope, and such image is associated with the file for the mail piece in the lifecycle monitoring system.

Figure 2:
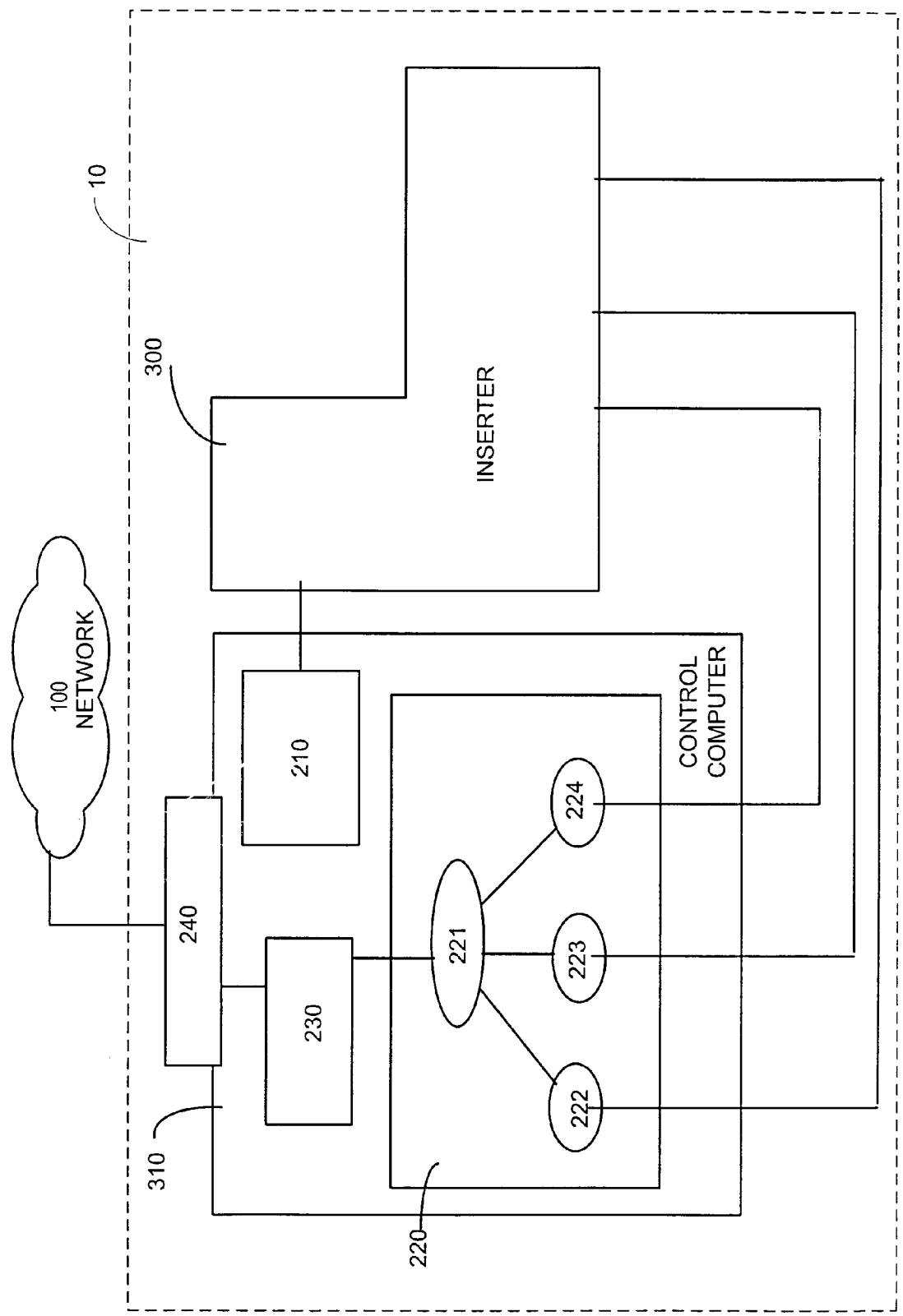
FIG. 2 is a second view of an exemplary inserter and controller computer combination.

In FIG. 2, the mail production system 10 is depicted with attention to details of the controller computer 310. In the preferred embodiment, the controller computer 310 is comprised of a general purpose computer coupled with the inserter 300 to provide instructions and to receive data. Alternatively, controller 310 may be any kind of processor, and may be embedded directly in the inserter 300 structure. Within controller 310, a mail processing instruction module 210 provides instructions to the inserter 300 (and its respective modules) for creating mail pieces. Typically, instructions for each mail piece in a mail run will be included in a Mail Run Data File (MRDF). The instruction module 210 provides the appropriate MRDF instructions for the inserter equipment to create the mail pieces.

A component data processing module 220 receives and processes status data gathered from the inserter. Status data processing objects 222-224 each receive data from a respective inserter component. For example, object 222 may receive accumulator status data, object 223 may receive folder status data, and object 224 may receive document feeder status data. It will be understood that the status data processing objects can be for data corresponding to any components of inserter 300. In a preferred embodiment, the module 220 further includes a data parser object 221 for organizing and retrieving inserter status information from the objects 222-224.

A network protocol object 230 acts as an interface for the data processing module 220 and external data requests. Preferably, the protocol module 220 monitors a network port 240 for incoming connections and accepts them. In an HTTP environment, the protocol object 230 is an HTTP web server object and the port 240 is a TCP/IP port. The HTTP web server object 230 accepts and decodes any requested connections, and provides a connection to the requested information in the data processing module 220.

The network port 240 is connected to an external network 100, such as the World Wide Web. Consequently, remote computers on the network 100 may directly receive real-time inserter 300 status and configuration data without need for intermediary storage. By integrating the forementioned network server components, there is no need to store a status database in controller computer 310 hard drive. Further, there is no need for periodic uploading of database information to a separate external server computer.

In a preferred exemplary embodiment, using the status and configuration data, a remote computer may include a graphical display of inserter components. The display could indicate the set up configuration of the components, or include statistical information relating to quantities of mail processed, or rates at which they are operating. Information supplied may include equipment parameters such as maximum or minimum speeds. In addition to parameters, the information may include actual operating conditions and status. For example for a feeder device, a minimum feed time parameter may be displayed. Other displayed status may include an actual feed rate and an actual number of jams for the feeder during the course of the current mail run.

Thus, although the invention has been described with respect to a preferred embodiment thereof, it will be understood by those skilled in the art that the foregoing and various other changes, omissions and deviations in the form and detail thereof may be made without departing from the scope of this invention, as further described in the following claims.

What is claimed is:

1. An inserter system comprising:
   a plurality of modules for accumulating and assembling sheets into mail pieces; and
   a controller computer coupled to the plurality of modules and controlling assembly of the mail pieces in accordance with predetermined instructions, the controller computer receiving status data from the plurality of modules, the controller computer comprising one or more software-based data processing objects configured for processing the status data to determine inserter status, the data processing objects further configured for passing the processed status data directly to a network protocol object for transmittal, the controller computer further comprising a network port for directly transmitting the status data processed by the network protocol object to an external network, and the network port and the network protocol object configured for accepting incoming requests from the external network, and the controller computer configured for transmitting inserter status data in real-time, without need for withdrawal of information from a database or repository in the controller computer;
   wherein the network protocol object is an HTTP web server object and the network port is a TCP/IP port;

wherein the controller computer is further configured such that selection of data for transmission occurs in real-time, without need for withdrawal of information from the database or repository in the controller computer; and wherein the controller computer further comprises a processor and a memory coupled to the processor.

2. The inserter system of claim 1 wherein the controller computer is a general purpose computer coupled to the plurality of modules.

3. The inserter system of claim 1 wherein the processor of the controller computer is an embedded processor fixed within the plurality of modules.

4. The inserter system of claim 1 wherein the data processing objects includes a parser to select data for transmission responsive to the incoming requests from the external network.

\* \* \* \* \*

UNITED STATES PATENT AND TRADEMARK OFFICE
CERTIFICATE OF CORRECTION

PATENT NO. : 7,596,532 B2 Page 1 of 1
APPLICATION NO. : 10/675368
DATED : September 29, 2009
INVENTOR(S) : Paul Mayer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1853 days.

Signed and Sealed this

Twenty-eighth Day of September, 2010

David J. Kappos
*Director of the United States Patent and Trademark Office*